(12) United States Patent
Choi et al.

(10) Patent No.: US 12,057,035 B2
(45) Date of Patent: Aug. 6, 2024

(54) DISPLAY APPARATUS

(71) Applicant: SAMSUNG ELECTRONICS CO., LTD., Suwon-si (KR)

(72) Inventors: Daesu Choi, Suwon-si (KR); Boumsik Kim, Suwon-si (KR); Seungjae Kim, Suwon-si (KR); Jisu Kim, Suwon-si (KR); Hunsung Kim, Suwon-si (KR); Yousub Lee, Suwon-si (KR); Sangbong Jeon, Suwon-si (KR); Hyunyong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 17/686,033

(22) Filed: Mar. 3, 2022

(65) Prior Publication Data
US 2022/0189351 A1  Jun. 16, 2022

Related U.S. Application Data

(63) Continuation of application No. PCT/KR2021/016368, filed on Nov. 10, 2021.

(30) Foreign Application Priority Data

Nov. 10, 2020  (KR) .................. 10-2020-0149399

(51) Int. Cl.
*G06F 1/16* (2006.01)
*G09F 9/30* (2006.01)

(52) U.S. Cl.
CPC ............ *G09F 9/301* (2013.01); *G06F 1/1652* (2013.01)

(58) Field of Classification Search
None
See application file for complete search history.

(56) References Cited

U.S. PATENT DOCUMENTS 7,232,313 B1 * 6/2007 Shinoda ............... H01R 35/02
439/31
9,473,839 B2  10/2016 Yu
(Continued)

FOREIGN PATENT DOCUMENTS

CN 210181382 U 3/2020
CN 110946418 A 4/2020
(Continued)

OTHER PUBLICATIONS

International Search Report (PCT/ISA/210) dated Mar. 4, 2022 issued by the International Search Authority in International Application No. PCT/KR/2021/016368.
(Continued)

*Primary Examiner* — Anthony Q Edwards
*Assistant Examiner* — Rashen E Morrison
(74) *Attorney, Agent, or Firm* — Sughrue Mion, PLLC

(57) ABSTRACT

Provided is a display apparatus including a housing having an opening, a roll provided inside of the housing, a display configured to be rolled around the roll and drawn out or in through the opening, a frame provided on an upper end or a lower end of the display, a first link having a first end rotatably connected to a first end of the frame, a second link having a first end rotatably connected to a second end of the frame, a first slider and a second slider rotatably connected to a second end of the first link and a second end of the second link, respectively, and a first rail and a second rail horizontally provided inside of the housing and providing movement paths of the first slider and the second slider, respectively, wherein the first rail and the second rail at least partially overlap each other in a front-rear direction.

20 Claims, 11 Drawing Sheets

(56) References Cited

U.S. PATENT DOCUMENTS

| | | | |
|---|---|---|---|
| 9,844,152 B2* | 12/2017 | Heo | H05K 1/028 |
| 10,227,808 B2* | 3/2019 | Siddiqui | E05D 3/12 |
| 10,390,443 B2 | 8/2019 | Kim et al. | |
| 10,410,549 B1* | 9/2019 | Kim | G06F 1/1601 |
| 10,485,115 B1* | 11/2019 | Cromer | H04M 1/0216 |
| 10,492,607 B2 | 12/2019 | Choi et al. | |
| 10,506,726 B2 | 12/2019 | Kang et al. | |
| 10,534,402 B1 | 1/2020 | Kim et al. | |
| 10,586,475 B2 | 3/2020 | Park et al. | |
| 10,798,836 B2* | 10/2020 | Manuel | E05F 1/12 |
| 11,037,472 B2 | 6/2021 | Park et al. | |
| 11,064,804 B2 | 7/2021 | Choi et al. | |
| 11,127,320 B2 | 9/2021 | Park et al. | |
| 2012/0120618 A1* | 5/2012 | Bohn | H04M 1/022 361/679.01 |
| 2015/0089974 A1* | 4/2015 | Seo | A44C 5/0076 63/1.13 |
| 2015/0215692 A1 | 7/2015 | Yu | |
| 2016/0239133 A1* | 8/2016 | Ko | G06F 1/1643 |
| 2016/0357052 A1* | 12/2016 | Kim | G02F 1/133308 |
| 2017/0061836 A1* | 3/2017 | Kim | G06F 1/1626 |
| 2018/0070467 A1 | 3/2018 | Kim et al. | |
| 2018/0114471 A1 | 4/2018 | Park et al. | |
| 2018/0160554 A1 | 6/2018 | Kang et al. | |
| 2018/0324964 A1* | 11/2018 | Yoo | F16C 29/02 |
| 2019/0014902 A1 | 1/2019 | Choi et al. | |
| 2019/0036068 A1* | 1/2019 | Kim | G06F 1/1601 |
| 2019/0196548 A1* | 6/2019 | Kim | G09F 9/301 |
| 2019/0357675 A1 | 11/2019 | Choi et al. | |
| 2020/0068728 A1 | 2/2020 | Kang et al. | |
| 2020/0168131 A1 | 5/2020 | Park et al. | |
| 2020/0257335 A1* | 8/2020 | Kim | G06F 1/1641 |
| 2021/0345773 A1 | 11/2021 | Choi et al. | |

FOREIGN PATENT DOCUMENTS

| | | |
|---|---|---|
| EP | 3367675 A2 | 8/2018 |
| KR | 20-2006-0000078 U | 11/2006 |
| KR | 10-2014-0017960 A | 2/2014 |
| KR | 10-2017-0087764 A | 7/2017 |
| KR | 10-2018-0045980 A | 5/2018 |
| KR | 10-2019-0054430 A | 5/2019 |
| KR | 10-2019509 B1 | 9/2019 |
| KR | 10-2020-0020509 A | 2/2020 |
| KR | 10-2080045 B1 | 2/2020 |
| KR | 10-2020-0058128 A | 5/2020 |

OTHER PUBLICATIONS

Written Opinion (PCT/ISA/237) dated Mar. 4, 2022 issued by the International Search Authority in International Application No. PCT/KR2021/016368.

Communication issued Jan. 23, 2024 by the European Patent Office in European Patent Application No. 21892328.2.

\* cited by examiner

DISPLAY APPARATUS

CROSS-REFERENCE TO RELATED APPLICATION(S)

This application is a bypass continuation of International Application No. PCT/KR2021/016368, filed on Nov. 10, 2021, which is based on and claims priority to Korean Patent Application No. 10-2020-0149399, filed on Nov. 10, 2020, in the Korean Intellectual Property Office, the disclosures of which are incorporated by reference herein in their entireties.

BACKGROUND

1. Field

The disclosure relate to a display apparatus, and more particularly, to a display apparatus having improved link structures to minimize a size of a housing in which a rollable display is accommodated.

2. Description of Related Art

In recent display apparatuses, rollable displays are drawn out through openings provided in housings only when users use the display apparatuses. Accordingly, when the display apparatus is not in use, a black screen is not exposed to the outside, thereby obtaining an effect in terms of design and minimizing a volume of the display apparatus. Thus, the user may install the display apparatus in any of various locations and easily move the display apparatus to a desired location.

However, link structures for drawing out and supporting the large rollable display require great rigidity and size, and a link driving device needs to have a large capacity. Thus, there has been an increasing need for minimizing the size of the link structures and gaps between the link structure, while making it possible that the driving device has an optimized capacity.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

Provided is a display apparatus having improved link structures to minimize a size of a housing in which a rollable display is accommodated.

According to an aspect of the disclosure, there is provided a display apparatus including a housing having an opening, a roll provided inside of the housing, a display configured to be rolled around the roll and drawn out or in through the opening, a frame provided on an upper end or a lower end of the display, a first link having a first end rotatably connected to a first end of the frame, a second link having a first end rotatably connected to a second end of the frame, a first slider and a second slider rotatably connected to a second end of the first link and a second end of the second link, respectively, and a first rail and a second rail horizontally provided inside of the housing and providing movement paths of the first slider and the second slider, respectively, wherein the first rail and the second rail at least partially overlap each other in a front-rear direction.

The display apparatus may further include a driving device configured to move the first slider and the second slider in opposite directions.

The driving device may include a first screw provided in parallel with the first rail, a second screw provided in parallel with the second rail, and a motor configured to rotate the first screw and the second screw, wherein the first slider and the second slider include a ball nut moving as the first screw and the second screw rotate, respectively.

The driving device may further include a first gear and a second gear provided on a first end of the first screw and a first end of the second screw, respectively, the first gear and the second gear being engaged with each other in a gear ratio of 1:1, and the motor may be configured to rotate the first gear or the second gear.

The motor may include a third gear connected with the first gear or the second gear.

The display apparatus may further include a first pressure device provided in parallel with the first rail and configured to pull or push the first slider, and a second pressure device provided in parallel with the second rail and configured to pull or push the second slider.

The first link and the second link may be inclined at an angle of 3 to 10 degrees with respect to a horizontal plane based on the display being completely drawn into the housing through the opening.

The first link and the second link may be inclined at an angle of 55 to 85 degrees with respect to a horizontal plane, when the display is completely drawn out of the housing through the opening.

A thickness of the first link and a thickness of the second link may gradually decrease from the first ends to the second ends thereof.

The display apparatus may further include at least one first sensor configured to detect movement amounts of the first slider and the second slider.

The display apparatus may further include a first support member and a second support member provided on a left side and a right side of the first rail and the second rail, respectively, inside the housing, a third link having a first end rotatably connected to the first support member and the second end rotatably connected to a point of the first link, and a fourth link having a first end rotatably connected to the second support member and the second end rotatably connected to a point of the second link.

A thickness of the third link and a thickness of the fourth link may gradually decrease from the first ends to the second ends thereof.

The first support member may include a pair of first plates supporting a front surface and a rear surface of the third link, respectively, and the second support member may include a pair of second plates supporting a front surface and a rear surface of the fourth link, respectively.

The third link and the fourth link may have a first protrusion and a second protrusion provided on the rear surfaces thereof, respectively, the first plates and the second plates may have a first groove and a second groove in a shape corresponding to rotation radii of the first protrusion and the second protrusion, respectively, and the first groove and the second groove may support the first protrusion and the second protrusion, respectively.

The display apparatus may further include at least one second sensor configured to detect rotation amounts of the third link and the fourth link.

According to another aspect of the disclosure, there is provided a display apparatus including a housing having an opening, a roll provided inside of the housing, a display configured to be rolled around the roll and drawn out or in through the opening, a frame provided on an upper end or a lower end of the display, a first link having a first end rotatably connected to a first end of the frame, a second link having a first end rotatably connected to a second end of the frame, a first slider and a second slider rotatably connected to a second end of the first link and a second end of the second link, respectively, and a first rail and a second rail horizontally provided inside of the housing and providing movement paths of the first slider and the second slider, respectively, wherein the first rail and the second rail at least partially overlap each other in a front-rear direction, and wherein the first link and the second link are inclined at an angle with respect to a horizontal plane based on the display being completely drawn into the housing through the opening.

The display apparatus may further include a driving device configured to move the first slider and the second slider in opposite directions.

The driving device may include a first screw provided in parallel with the first rail, a second screw provided in parallel with the second rail, and a motor configured to rotate the first screw and the second screw, wherein the first slider and the second slider include a ball nut moving as the first screw and the second screw rotate, respectively.

The first link and the second link may be inclined at the angle of 3 to 10 degrees with respect to the horizontal plane based on the display being completely drawn into the housing through the opening.

The first link and the second link may be inclined at the angle of 55 to 85 degrees with respect to the horizontal plane, when the display is completely drawn out of the housing through the opening.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Embodiments described below are exemplarily described to help understanding of the disclosure, and it is to be understood that various modifications of the disclosure may be implemented unlike the embodiments described herein. However, in describing the disclosure, if it is determined that the detail description of relevant known functions or elements may obscure the gist of the disclosure, the detailed description and concrete illustration thereof will be omitted. Further, to help understanding of the disclosure, the accompanying drawings are not necessarily illustrated to scale but dimensions of some elements may be exaggerated.

The terms used in the specification and the claims are general terms selected in consideration of the functions of the disclosure. However, these terms may vary depending on intentions of those skilled in the art, legal or technical interpretation, emergence of new technologies, and the like. Also, there may be some terms arbitrarily selected by the applicant. These terms may be construed as meanings defined in the specification and, unless explicitly defined, may be construed based on the entire contents of the specification and the common technical knowledge in the art.

In the specification, the expressions "have", "may have", "include", "may include", and the like indicate the existence of corresponding features (for example, elements such as numerical values, functions, operations, or components), and do not preclude the presence of additional features.

In the specification, elements necessary in describing each embodiment of the disclosure are described, and the elements are not necessarily limited thereto. Therefore, some of the elements may be modified or omitted, and other elements may be added. In addition, the elements may also be dispersedly arranged in devices independent from each other.

Furthermore, although embodiments of the disclosure will be described in detail with reference to the accompanying drawings and the contents illustrated in the accompanying drawings, the disclosure is not limited by the embodiments.

Hereinafter, the disclosure will be described in more detail with reference to the accompanying drawings.

Figure 1:
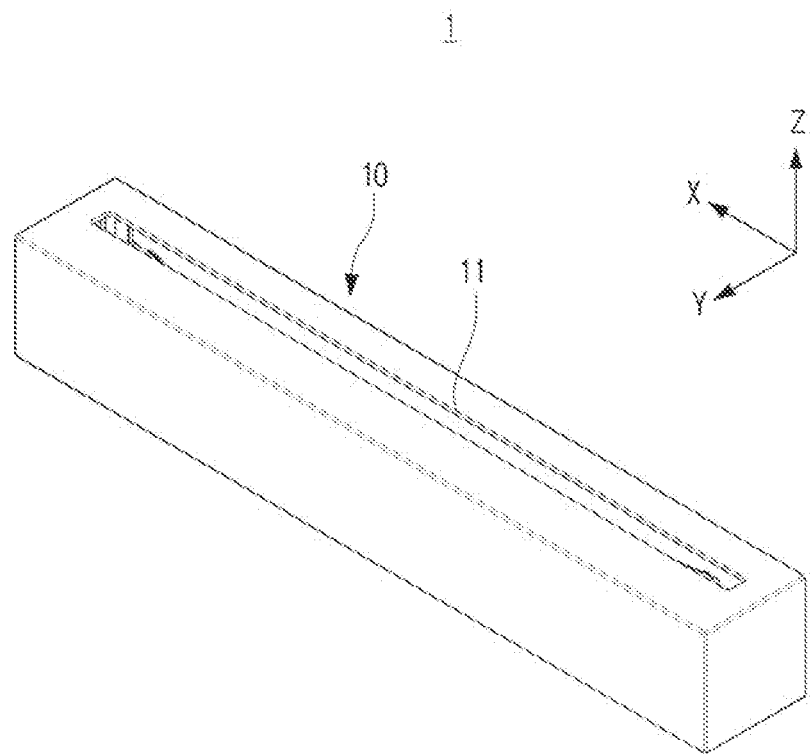
FIG. 1 is a perspective view of a display apparatus according to an embodiment of the disclosure.
Figure 2:
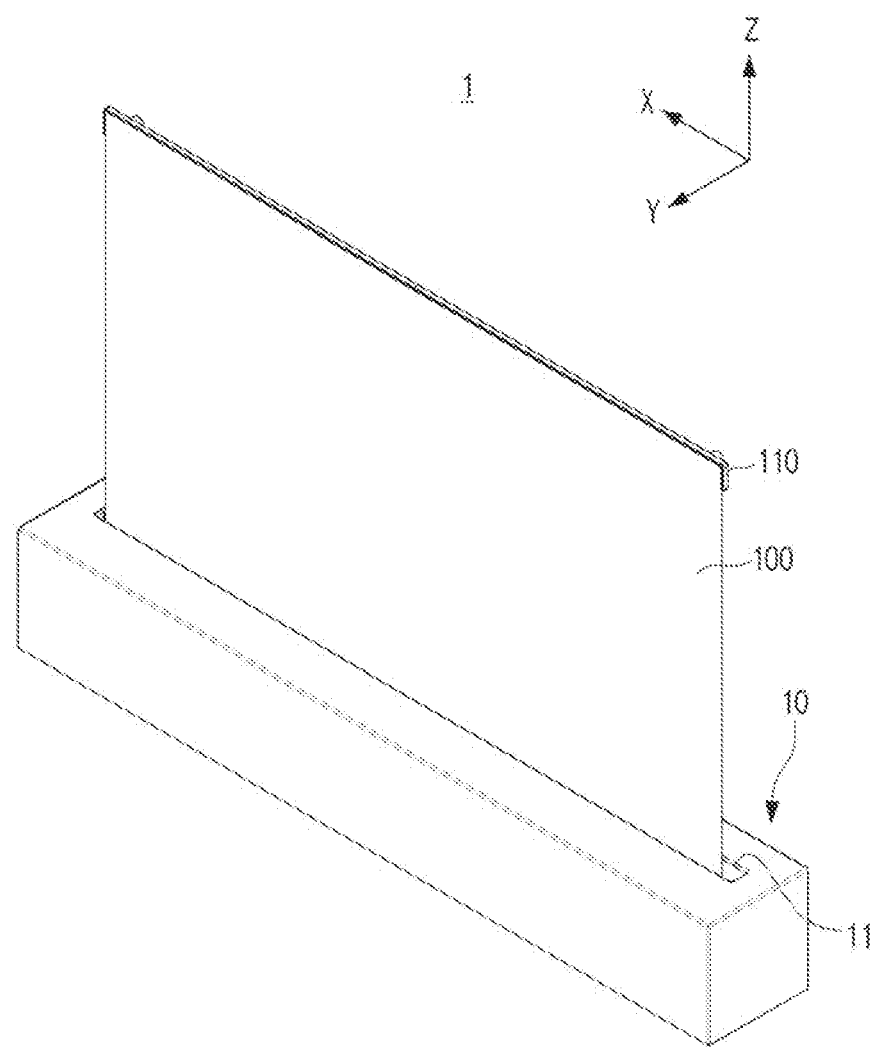
FIG. 2 is a perspective view illustrating a state in which a display is drawn out of a housing in FIG. 1.

FIG. 1 is a perspective view of a display apparatus according to an embodiment of the disclosure. FIG. 2 is a perspective view illustrating a state in which a display is drawn out of a housing in FIG. 1.

Referring to FIGS. 1 and 2, the display apparatus 1 according to an embodiment of the disclosure includes a housing 10, a display 100, and a roll 200 (FIG. 3), and may have a structure in which the display 100 is rolled around the roll 200 at normal times for storage inside the housing 10 and drawn out of the housing 10 as necessary to provide various types of images to a user.

The display apparatus 1 according to various embodiments of the disclosure may be a part of an electronic device, a piece of furniture, or a building/structure including an image display function. For example, the display apparatus 1 may include at least one of a television, a digital video disk (DVD) player, a smartphone, a desktop personal computer (PC), a tablet PC, a laptop PC, a personal digital assistant (PDA), a portable multimedia player (PMP), a mobile medical device, a camera, a wearable device, a TV box (e.g., Samsung HomeSync™, Apple TV™, or Google TV™), a game console, an electronic board, an electronic signature receiving device, a projector, or any type of measurement device (e.g., a water meter, an electricity meter, a gas meter, or a radio wave meter).

In addition, the display apparatus 1 according to an embodiment of the disclosure may be applied to not only a screen device that emits light by itself but also a reflective screen device that reflects light incident from a projector.

The housing 10 forms an external appearance of the display apparatus 1, and may be made of a metal or plastic material. In addition, the housing 10 may have a substantially rectangular parallelepiped shape, but is not limited thereto. The material, size, and shape of the housing 10 may be formed in various ways.

The housing 10 may include an opening 11 in one surface thereof to accommodate the display 100 therein and unroll the display 100 out of the housing 10. That is, the display 100 may be drawn out or in through the opening 11 of the housing 10 as necessary.

The opening 11 may be located in an upper surface of the housing 10, but the location of the housing 11 is not limited thereto. The opening 11 may be located in at least one of a front surface, a rear surface, a side surface, and a lower surface of the housing 10.

The display 100 may display various kinds of contents (e.g., texts, images, videos, icons, and symbols) to the user. The display 100 may include, for example, a liquid crystal display (LCD), a light-emitting diode (LED) display, an organic light-emitting diode (OLED) display, a microelectro-mechanical system (MEMS) display, an electronic paper display, or a flexible display having a foldable or bendable display unit.

An upper end or a lower end of the display 100 may be supported by a frame 110. The frame 110 may have a length corresponding to a width of the display 100. The frame 110 may protect the upper end of the display 100 from external impact.

In FIG. 2, the frame 110 is illustrated as being provided only at the upper end of the display 100, but embodiments are not limited thereto. For example, the frame 110 may be provided at the lower end of the display 100.

In a case where the frame 110 supports the lower end of the display 100, when link structures, which will be described later, push the frame 110 downward, the display 100 may be drawn out of the housing 10 while moving downward.

A rear surface of the frame 110 may be lifted, lowered, and supported by the link structures, which will be described later.

The user may grip the frame 110 and pull the frame 110 out of the housing 10 or push the frame 110 into the housing 10, and accordingly, the display 100 may be drawn out or in through the opening 11 of the housing 10. For example, the frame 110 may be used as a handle gripped by the user when the display 100 is drawn out or in.

Figure 3:
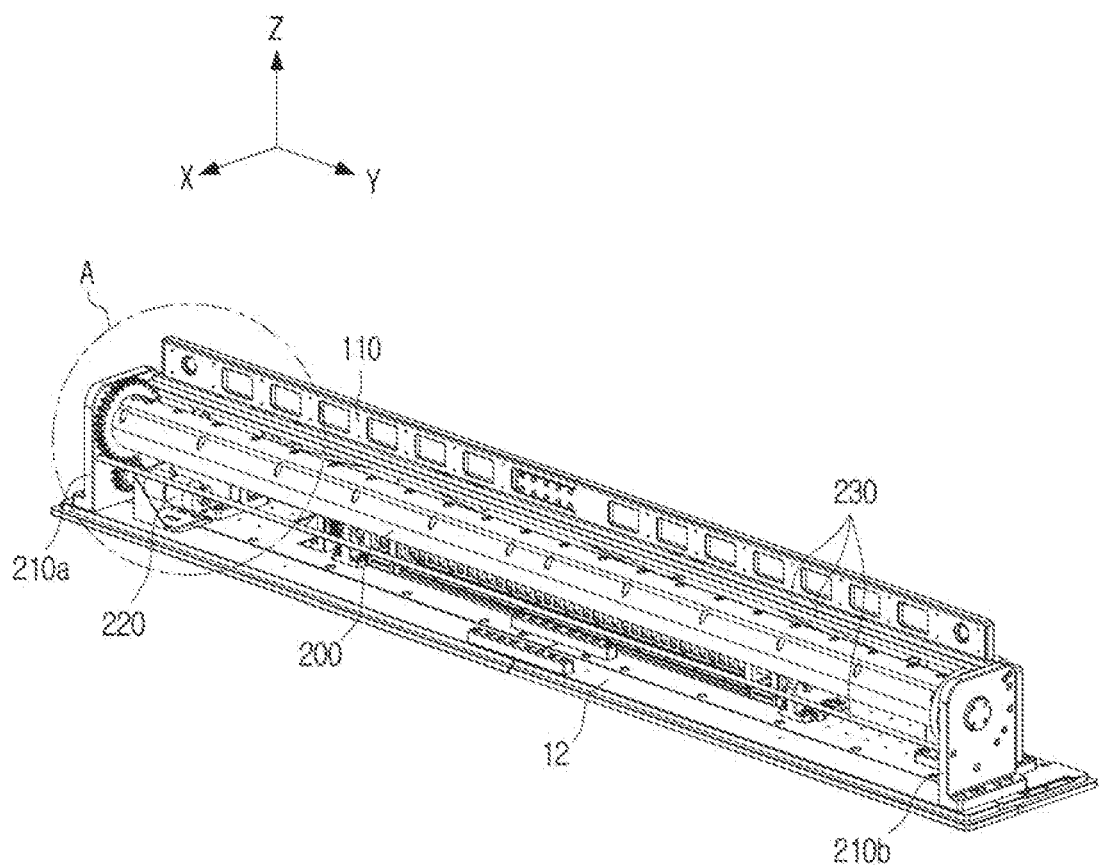
FIG. 3 is a perspective view of a roll disposed inside the housing of FIG. 1.
Figure 4:
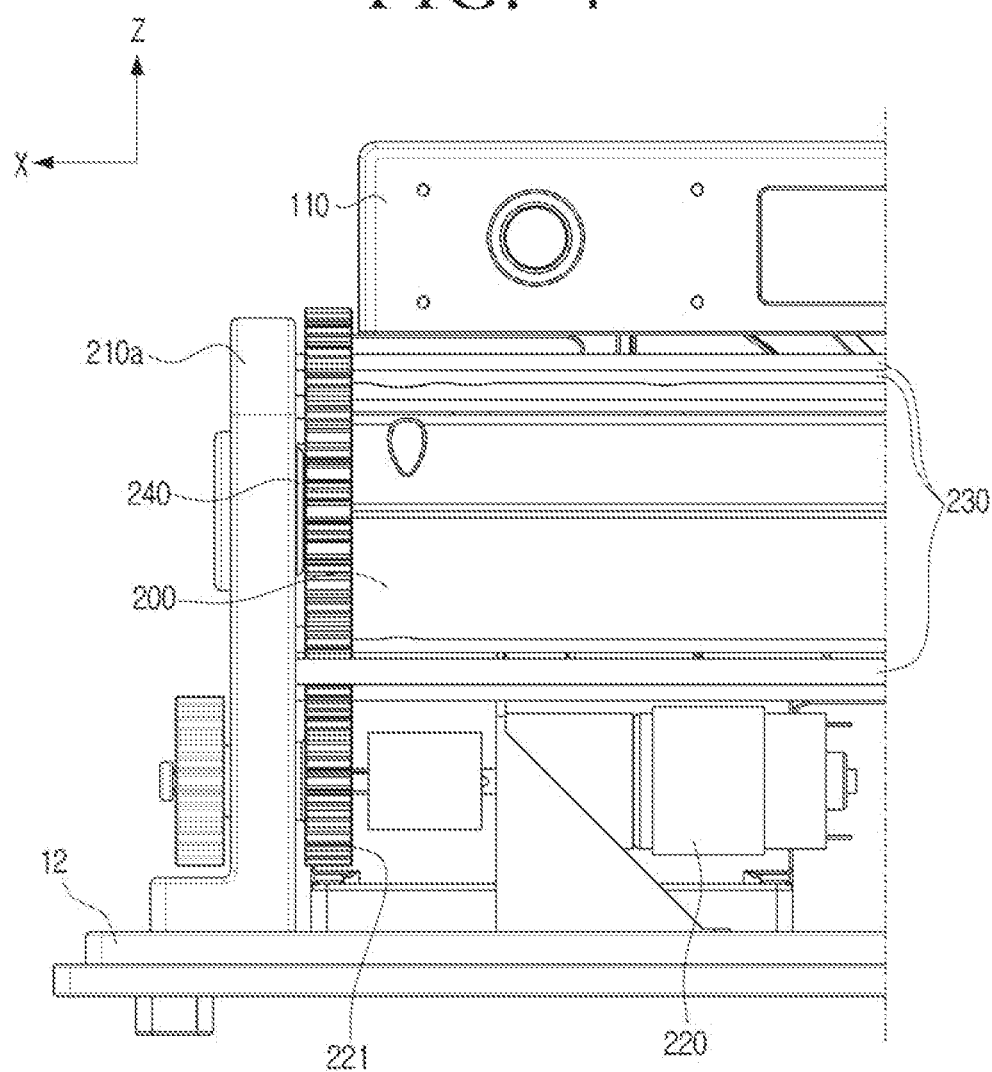
FIG. 4 is an enlarged front view of part A of FIG. 3.

FIG. 3 is a perspective view of the roll disposed inside the housing of FIG. 1. FIG. 4 is an enlarged front view of part A of FIG. 3.

Referring to FIGS. 3 and 4, the display apparatus 1 according to an embodiment of the disclosure may include the roll 200, a pair of sidewalls 210a and 210b, a roll driving motor 220, a plurality of rods 230, and a roll gear 240.

The roll 200 may have a substantially cylindrical shape, and may have a length corresponding to a length (width) of the display 100 in a horizontal direction. One area of the display 100 may be rolled around an outer surface of the roll 200.

Opposite ends of a rotation shaft of the roll 200 may be rotatably supported by the pair of sidewalls 210a and 210b fixed to a base 12 of the housing 10, respectively.

When the rotation shaft of the roll 200 rotates in one direction, the display 100 may be rolled around the roll 200 and drawn into the housing 10, and when the rotation shaft of the roll 200 rotates in the opposite direction, the display 100 rolled around the roll 200 may be unrolled and drawn out of the housing 10.

The roll driving motor 220 may rotate the roll 200 to draw the display 100 into the housing 10 or draw the display 100 out of the housing 10. For example, the roll driving motor 220 may be implemented as a DC motor, a brushless motor, a step motor, or a servo motor to rotate the rotation shaft of the roll 200 around which the display 100 is rolled.

The plurality of rods 230 may be disposed in the horizontal direction between a first link 310 and a second link 320 (FIG. 5) and the roll 200. Opposite ends of the plurality of rods 230 may be supported by the pair of sidewalls 210a and 210b, respectively.

Accordingly, it is possible to minimize interference between the link structures supporting the frame 110 of the display 100 and the roll 200 in a rotating state. In addition, the plurality of rods 230 may function as a partition wall separating a space between the link structures and the roll 200, and may have a maximum rigidity with a thin thickness.

For example, the plurality of rods 230 define the space in which the display 100 moves, and thus, the display 100 protected by the plurality of rods 230 may more stably move with minimized interference with a plurality of components inside the housing 10.

The roll gear 240 may be fitted on the rotation shaft of the roll 200. Also, a damping gear 221 of the roll driving motor 220 may be disposed to be engaged with the roll gear 240.

When the roll driving motor 220 is driven and the damping gear 221 rotates in one direction, the roll gear 240 engaged with the damping gear 221 may rotate in the opposite direction to the damping gear 221, and accordingly, the rotation shaft of the roll 200 may rotate.

The damping gear 221 may be engaged with the roll gear 240 at all times, thereby preventing the roll gear 240 from rotating unintentionally. In addition, the display 100 may be continuously kept tensioned in a direction in which the display 100 is rolled around the roll 200 by the damping gear 221. Accordingly, the display 100 may be prevented from wrinkling when drawn out.

Figure 5:
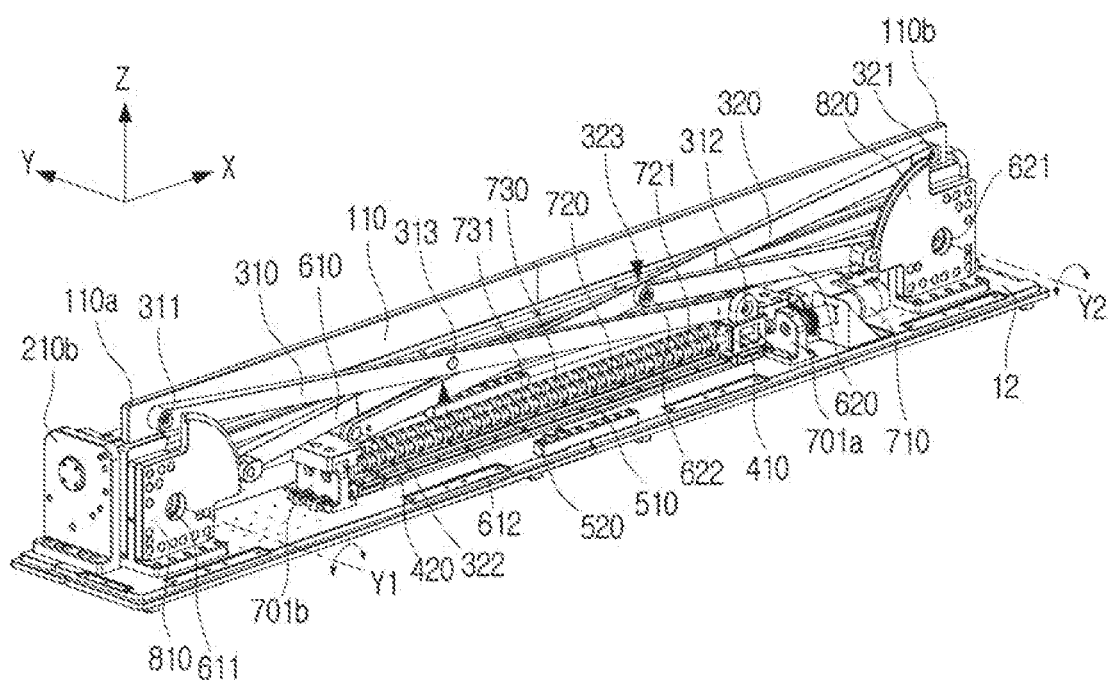
FIG. 5 is a rear perspective view of a state in which the display is drawn into the housing according to an embodiment.
Figure 6:
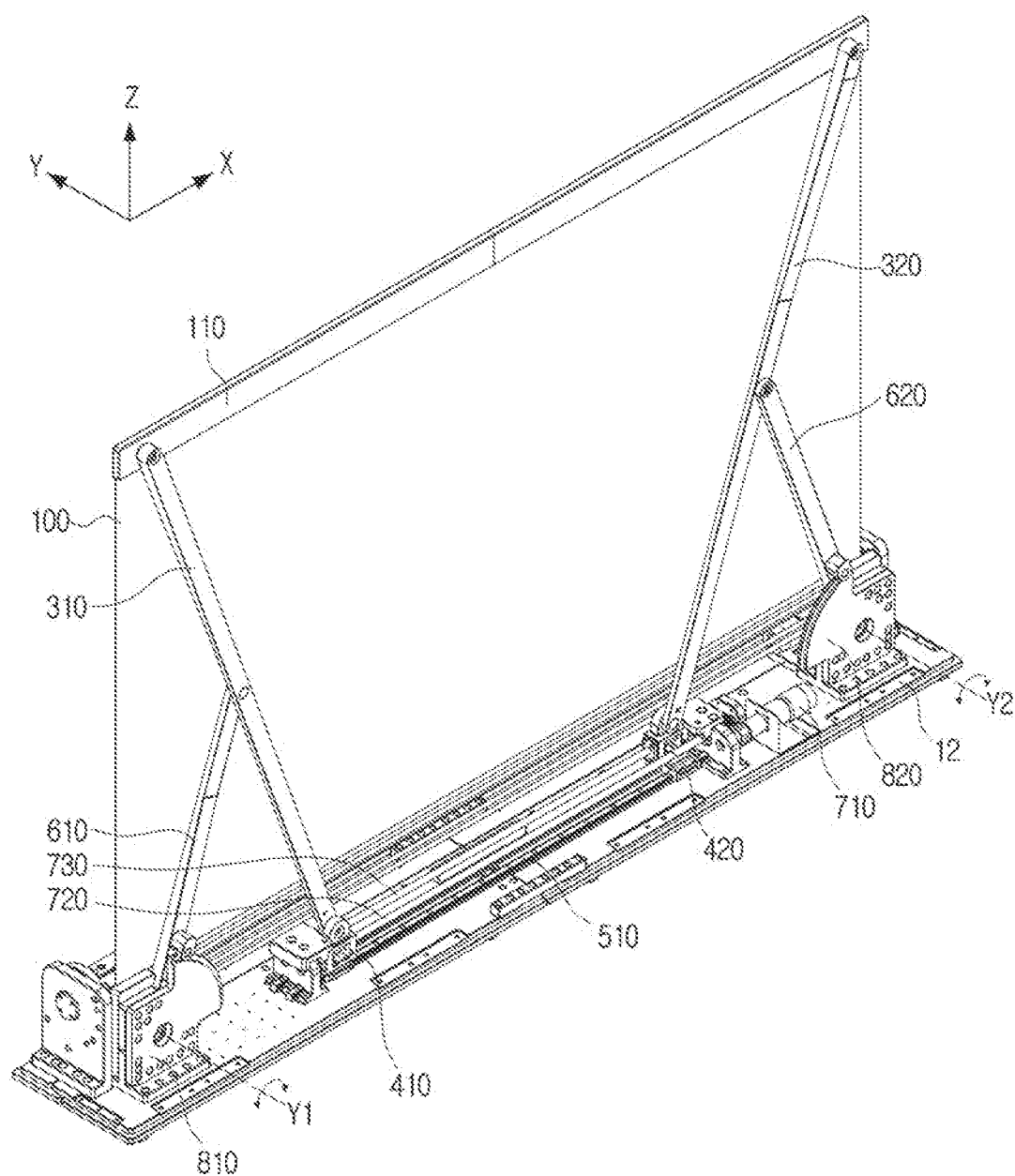
FIG. 6 is a rear perspective view of a state in which the display is drawn out of the housing according to an embodiment.

FIG. 5 is a rear perspective view of a state in which the display is drawn into the housing according to an embodiment. FIG. 6 is a rear perspective view of a state in which the display is drawn out of the housing according to an embodiment.

Referring to FIGS. 5 and 6, the display apparatus 1 according to an embodiment of the disclosure may include a first link 310, a second link 320, a first slider 410, a second slider 420, a first rail 510, and a second rail 520.

One end 311 of the first link 310 may be rotatably connected to one end 110a of the frame 110, and one end 321 of the second link 320 may be rotatably connected to the other end 110b of the frame 110. One end 110a and the other end 110b of the frame 110 may be located in a left area and a right region of the frame 110, respectively.

Lengths of the first and second links 310 and 320 may be proportional to a size of the display 100. For example, as the display 100 having a larger size is drawn out, the frame 110 of the display 100 is spaced farther away from the housing 10, and thus, the first and second links 310 and 320 supporting the frame 110 may have longer lengths.

The respective lengths of the first and second links 310 and 320 may be longer than a vertical length of the display 100 and shorter than a horizontal length of the display 100.

When the display 100 is completely drawn out of the housing 10, the first and second links 310 and 320 may be obliquely disposed to be inclined at an angle, rather than being vertically disposed, to support the display. Also, when the display 100 is completely drawn into the housing 10, the first and second links 310 and 320 may be obliquely disposed to be inclined at an angle, rather than being horizontally disposed. Accordingly, it is possible to prevent an excessive increase in initial driving force for changing the first and second links 310 and 320 from a lying state to a standing state.

The first slider 410 may be rotatably connected to the other end 312 of the first link 310, and the second slider 420 may be rotatably connected to the other end 322 of the second link 320. The first and second sliders 410 and 420 may move along the first and second rails 510 and 520, respectively.

The first link 310 may rotate around the other end 312, and the other end 312 of the first link 310 may be moved in the horizontal direction by the first slider 410. Similarly, the second link 320 may rotate around the other end 322, and the other end 322 of the second link 320 may be moved in the horizontal direction by the second slider 420.

The first link 310 may have a rotation axis formed at a point connected to the first slider 410, and the second link 320 may have a rotation axis formed at a point connected to the second slider 420.

For example, the first and second links 310 and 320 may rotate around the respective rotation axes moving in the horizontal direction, and the display 100 connected to the respective one ends 311 and 321 of the first and second links 310 and 320 may be lifted or lowered.

The first rail 510 may be horizontally disposed inside the housing 10 to provide a movement path for the first slider 410, and the second rail 520 may be horizontally disposed inside the housing 10 to provide a movement path for the second slider 420. Lower surfaces of the first and second sliders 410 and 420 may be fitted on the first and second rails 510 and 520, respectively.

The first and second rails 510 and 520 may overlap each other in at least one section in a front-rear direction. For example, the first rail 510 may be disposed behind the second rail 520, but is not limited thereto. The second rail 520 may be disposed behind the first rail 510.

The first and second rails 510 and 520 may be arranged to appear to overlap each other in at least one section, when viewed from the front or rear of the display apparatus 1. For example, the first and second rails 510 and 520 may provide respective horizontal movement paths of the first and second sliders 410 and 420 which overlap each other in the front-rear direction.

The first rail 510 and the second rail 520 may have the same length, and both may be disposed in the horizontal direction of the housing 10 (a direction parallel to the X axis). In addition, the first and second rails 510 and 520 may overlap each other in all sections in the front-rear direction.

The first and second rails 510 and 520 may be fixedly disposed on the base 12 of the housing 10 to be straight in parallel to the X axis. Accordingly, the first and second sliders 410 and 420 may move in parallel to the X axis along the straight paths. For example, the first and second sliders 410 and 420 may have one translational degree of freedom parallel to the X axis.

When the display 100 is completely drawn into the housing 10, the first slider 410 may be located at a right end of the first rail 510, and the second slider 420 may be located at a left end of the second rail 520. Accordingly, the first and second links 310 and 320 may be disposed to intersect with each other in a substantially "X" shape.

The first and second links 310 and 320 may be formed to have a thickness that gradually decreases from one ends 311 and 321 to the other ends 312 and 322, respectively. For example, the first and second links 310 and 320 may have an asymmetric shape in which the thickness varies along a length direction. Accordingly, the first and second links 310 and 320 overlapping each other in the front-rear direction may minimize mutual interference during a rotation operation.

In addition, when the display 100 is drawn out of the housing 10, the first and second links 310 and 320 may have a thinner thickness in areas adjacent to the other ends 312 and 322 exposed to the outside, thereby implementing a compact external appearance of the display apparatus 1.

As the first and second rails 510 and 520 overlap each other, when the display 100 is completely drawn into the housing 10 through the opening 11, the first and second links 310 and 320 may be disposed to be inclined at an angle of 3 to 10 degrees with respect to a horizontal plane (X-Y plane).

Also, as the first and second links 310 and 320 are disposed in the inclined state as described above, the housing 10 may more easily accommodate the first and second links 310 and 320 with relatively long lengths. For example, the housing 10 may accommodate the long first and second links 310 and 320 corresponding to the large display 100 with a minimum size.

In addition, the first and second links 310 and 320 are inclined at a predetermined angle, rather than being horizontally disposed, as their initial posture at the time of starting operating them, and thus, it is possible to minimize an initial driving force for moving one ends 311 and 321 of the first and second links 310 and 320 in the vertical direction.

In addition, when the display 100 is completely drawn out through the opening 11, the first and second links 310 and 320 may be inclined at an angle of 55 to 85 degrees with respect to the horizontal plane (X-Y plane). For example, the first and second links 310 and 320 may more stably support the completely drawn-out display 100 in a non-vertically disposed state.

When the display 100 is lifted, the first and second sliders 410 and 420 may move in the horizontal direction to be closer to each other, intersect with each other, and then be spaced apart from each other again. Accordingly, the first and second links 310 and 320 may rotate around the first and second sliders 410 and 420, respectively, to more easily support the frame 110 of the display 100 in a lifting state.

As the first and second rails 510 and 520 overlap with each other in at least one section in the front-rear direction, the first and second rails 510 and 520 may be formed to have a long length of 0.4 times or more the horizontal length of the housing 10. The first and second sliders 410 and 420 may move along the long paths of the first and second rails 510 and 520 having sufficiently long lengths, respectively.

The frame 110 may be spaced farther apart from the housing 10 as the larger display 100 is drawn out. As the first and second sliders 410 and 420 move along the first and second rails 510 and 520 having sufficiently long lengths, the first and second links 310 and 320 may sufficiently rotate at the predetermined angle or more, thereby more easily supporting the frame 110 located at a relatively high height in the Z axis direction.

Also, as the first and second rails 510 and 520 have an overlapping section, the first and second links 310 and 320 may rotate at an angle in a range of less than 90 degrees to more stably support the frame 110 of the display 100.

Each of general link structures supporting the display 100 is implemented by connecting a plurality of segmented links to one another by hinges. As a result, gaps may occur between the plurality of links. However, each of the first and second links 310 and 320 according to an embodiment of the disclosure is implemented as a single link structure having a long length, rather than a structure in which a plurality of segmented links are connected to one another, to more firmly and stably support the display 100 with no gaps in a state where hinge structures are minimized.

In addition, as the display apparatus 1 uses the first and second links 310 and 320, it is possible to minimize a power loss that may occur during a power transmission process in the multi-stage link structures, thereby minimizing a capacity of a motor (automatic mode) or a user's force (manual mode) for moving the display 100.

Furthermore, as the first and second links 310 and 320 have a thickness that varies in such a manner as to gradually decrease from one ends to the other ends thereof, mutual interference therebetween may be minimized even though they intersect with each other in a partial section during an operation, and an overall compact and slim appearance of the display apparatus 1 may be implemented.

Figure 7:
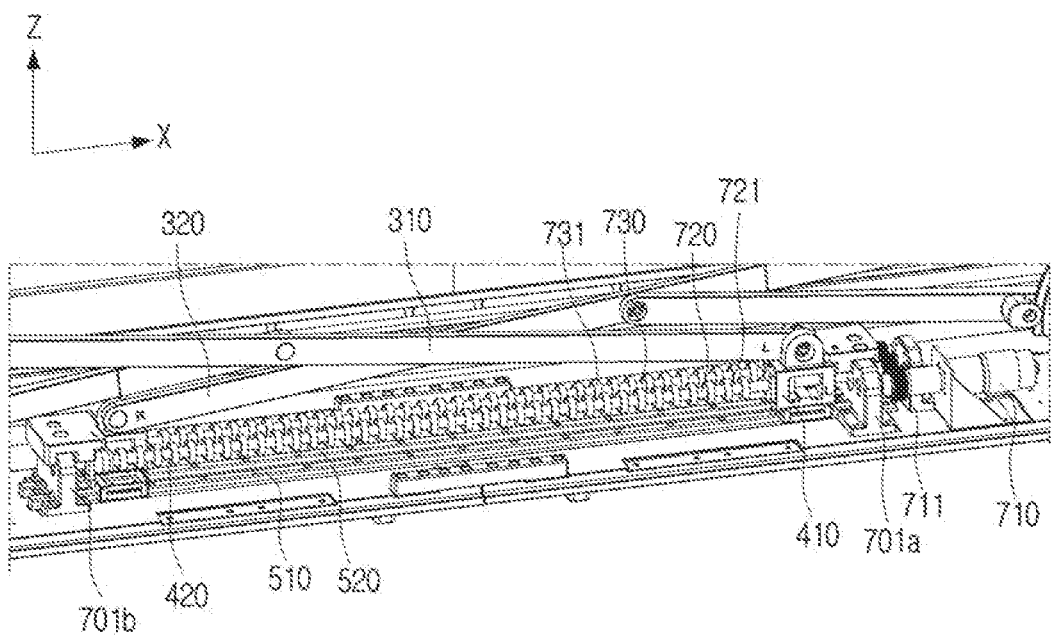
FIG. 7 is an enlarged view of a driving device of FIG. 5.
Figure 8:
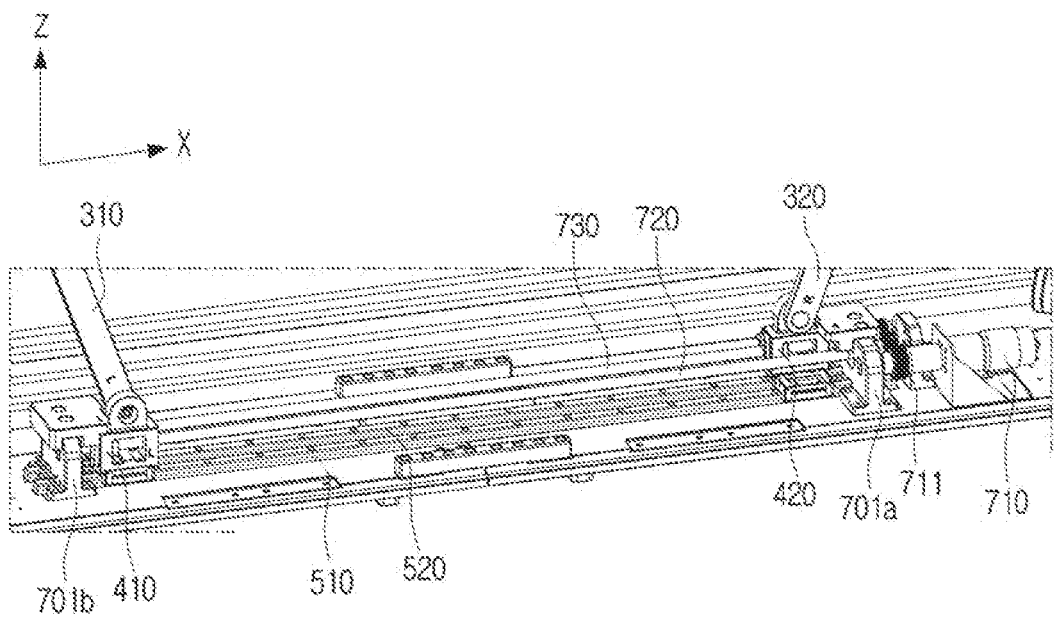
FIG. 8 is an enlarged view of the driving device of FIG. 6.
Figure 9:
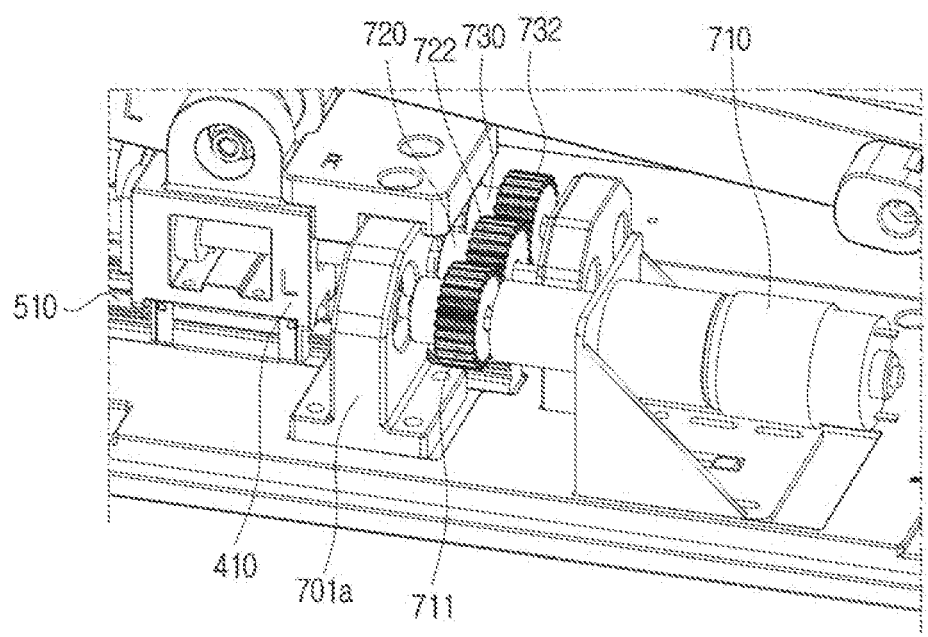
FIG. 9 is an enlarged view of gears of a motor and screws of FIG. 5.

FIGS. 7 and 8 are enlarged views of the driving device of FIGS. 5 and 6, respectively. FIG. 9 is an enlarged view of gears of the motor and the screws of FIG. 5.

Referring to FIGS. 7 to 9, the display apparatus 1 according to an embodiment of the disclosure may further include a driving device moving the first and second sliders 410 and 420 in opposite directions.

It will be described below that the display 100 is automatically moved by the driving device, but is not limited thereto. As described above, the user may grip the frame 110 of the display 100 and manually move the display 100 in person.

The driving device may include a first screw 720 disposed in parallel with the first rail 510, a second screw 730 disposed in parallel with the second rail 520, and a motor 710 rotating the first and second screws 720 and 730. In addition, the first and second sliders 410 and 420 may include ball nuts moving as the first and second screws 720 and 730 rotate, respectively.

However, the driving device is not implemented only with the ball nut structures moving linearly according to the rotational movement of the screws, but may be implemented with various types of linear actuators configured to horizontally and linearly move the first and second sliders 410 and 420 in opposite directions.

In addition, when the user manually moves the display, the driving device is not required to include the motor 710, and a rotation damper or a stopper device enabling a free stop may be alternatively used instead of the motor 710.

For example, opposite ends of the first and second screws 720 and 730 may be rotatably supported by two sidewalls 701*a* and 701*b* fixedly disposed on the base 12 of the housing 10, respectively, and the first and second screws 720 and 730 may penetrate through the first and second sliders 410 and 420, respectively.

In addition, as the first and second screws 720 and 730 are rotated by the motor 710, the first and second sliders 410 and 420 including ball nuts contacting the first and second screws 720 and 730 may move linearly along the first and second rails 510 and 520, respectively.

In addition, the driving device may include first and second gears 722 and 732 fitted on one ends of the first and second screws 720 and 730, respectively, and engaged with each other in a gear ratio of 1:1, and the motor 710 may rotate the first gear 722 or the second gear 732.

One motor 710 may rotate the first or second gear 722 or 732 at a predetermined angular velocity, and the other gear engaged in the gear ratio of 1:1 may be passively rotated at the same angular velocity.

Accordingly, the first and second sliders 410 and 420 may be synchronized with each other to move linearly at the same speed, and the first and second links 310 and 320 may move rotationally at the same angular velocity. Therefore, the first and second links 310 and 320 may support the display 100 while moving at the same speed in opposite directions, thereby moving the display 100 only in the vertical direction. As a result, the display 100 may be lifted or lowered stably along a predetermined path while maintaining its horizontal state without tilting or twisting in a specific direction.

In addition, in the manual mode in which the motor 710 rotating the first and second screws 720 and 730 is not separately provided, the first and second gears 722 and 732 may also be fitted on one ends of the first and second screws 720 and 730, respectively, in a state where they are engaged with each other in the gear ratio of 1:1. Accordingly, even when the user grips a certain area, for example, a left side, a right side, or the center of the display 100 and moves the display 100, the display 100 may be lifted or lowered stably along a predetermined path while maintaining its horizontal state without tilting or twisting in a specific direction.

In addition, the motor 710 may include a third gear 711 engaged with the first gear 722 or the second gear 732. For example, the motor 710 may directly rotate the first gear 722 or the second gear 732 as described above, but may also rotate the third gear 711 to rotate the first and second gears 722 and 732 that are consecutively engaged the third gear 711.

Also, the third gear 711 may function as a damper to limit unintended rotations of the first and second gears 722 and 732. For example, when the display 100 is completely drawn out to a specific height, the third gear 711 may prevent the first or second gear 722 or 732 from further rotating by using a frictional force between the engaged gears.

In addition, in a case where a sufficient gear ratio is secured based on a combination of threads of the first and second screws 720 and 730, the third gear 711 of the motor 710, and a reduction gear device of the motor 710 itself, the driving device may function to perform a free stop without a separate clutch device even if power from the motor 710 is cut off, thereby minimizing a capacity of the motor 710.

The display apparatus 1 may further include at least one first sensor detecting movement amounts of the first and second sliders 410 and 420. The first sensor may detect linear movement amounts of the first and second sliders 410 and 420, or may detect rotation amounts of the first and second screws.

In a case where the display 100 is lifted, the motor 710 may require an output in which the gravity of the display 100 is added. In a case where the display 100 is lowered, the motor 710 may require an output in which the gravity of the display 100 is deducted. Accordingly, in a case where the outputs of the motor 710 are unbalanced between the lifting of the display 100 and the lowering of the display 100, a large-capacity motor may be required, and an excessive force may be required when the user manually lifts the display.

In this regard, the display apparatus 1 may further include a first pressure member 721 disposed in parallel with the first rail 510 to pull or push the first slider 410, and a second pressure member 731 disposed in parallel with the second rail 520 to pull or push the second slider 420.

The first and second pressure members 721 and 731 may be disposed to surround the first and second screws 720 and 730, respectively. For example, the first pressure member 721 may be a tension spring connecting the first slider 410 to the second sidewall 701*b*. Also, the second pressure member 731 may be a tension spring connecting the second slider 420 to the first sidewall 701*a*.

The first and second pressure members 721 and 731 are not implemented only as tension springs, but may also be implemented as gas springs, rubber band devices, or compression springs.

When the display 100 is drawn out, the first slider 410 may move from the first sidewall 701*a* toward the second sidewall 701*b*, and the second slider 420 may move from the second sidewall 701*b* toward the first sidewall 701*a*.

When the display 100 is lifted, the first pressure member 721 may pull the first slider 410 toward the second sidewall 701*b*. Also, the second pressure member 731 may pull the second slider 420 toward the first sidewall 701*a* while being compressed.

For example, when the display 100 is lifted, the first and second pressure members 721 and 731 may be compressed to help the movement of the first and second sliders 410 and 420, respectively. Also, when the display 100 is lowered, the first and second pressure members 721 and 731 may be tensioned to interrupt the movement of the first and second sliders 410 and 420, respectively.

Accordingly, the output of the motor 710 may decrease when the display 100 is lifted, and the output of the motor 710 may increase when the display 100 is lowered, thereby balancing the outputs between the lifting and lowering operations.

As a result, the display apparatus 1 may be driven even by a small-capacity motor 710, and the display may be manually lifted by the user even with a little force.

In a case where the first and second pressure members 721 and 731 are implemented as compression springs, the first pressure member 721 may connect the first slider 410 to the first sidewall 701*a*, and the second pressure member 731 may connect the second slider 420 to the second sidewall 701*b*.

Accordingly, when the display 100 is lifted, the first and second pressure members 721 and 731 may be tensioned to help the movement of the first and second sliders 410 and 420, respectively, and when the display 100 is lowered, the first and second pressure members 721 and 731 may be compressed to interrupt the movement of the first and second sliders 410 and 420, respectively. That is, even when the first and second pressure members 721 and 731 are implemented as compression springs, the same effect may be caused as implemented as tension springs.

Although it has been described so far that the driving device is implemented as a ball screw device, the type of driving device is not limited thereto. The structure of the driving device may be implemented in various ways as long as the driving device is a linear actuator capable of linearly moving the first and second sliders 410 and 420.

The display apparatus 1 may further include a first support member 810, a second support member 820, a third link 610, and a fourth link 620.

The first and second support members 810 and 820 may be fixedly disposed on left and right sides of the first and second rails 510 and 520, respectively, inside of the housing 10. Structures of the first and second support members 810 and 820 will be described in detail below with reference to FIGS. 10 and 11.

One end 611 of the third link 610 may be rotatably connected to the first support member 810, and the other end 612 of the third link 610 may be rotatably connected to a point of the first link 310. One end 621 of the fourth link 620 may be rotatably connected to the second support member 820, and the other end 622 of the fourth link 620 may be rotatably connected to a point of the second link 320.

The third and fourth links 610 and 620 may be connected to respective center points of the first and second links 310 and 320, but the connection locations are not limited thereto. The third and fourth links 610 and 620 may have a shorter length than the first and second links 310 and 320.

The third and fourth links 610 and 620 may rotate about the first and second support members 810 and 820 fixedly disposed on the base 12 of the housing 10, respectively. The third and fourth links 610 and 620 may rotate about axes Y1 and Y2, respectively, and may have one rotational degree of freedom.

As the first and second links 310 and 320 rotate, the third and fourth links 610 and 620 may passively rotate in the opposite directions to the first and second links 310 and 320, respectively, to continue to support the one points of the first and second links 310 and 320, respectively.

Accordingly, the first and second links 310 and 320 may also more stably rotate with no gaps or vibrations in a forward or backward direction on a vertical plane (X-Z plane), while having one rotational degree of freedom.

In addition, the third and fourth links 610 and 620 may have a thickness that gradually decreases from one ends 611 and 621 to the other ends 612 and 622 thereof. Accordingly, the third and fourth links 610 and 620 may minimize interference with the first and second links 310 and 320 in a rotating state.

The display apparatus 1 may further include at least one second sensor detecting rotation amounts of the third and fourth links 610 and 620. Accordingly, it is possible to detect whether or not a gap occurs in the third and fourth links 610 and 620 or an external force is applied to the third and fourth links 610 and 620.

Figure 10:
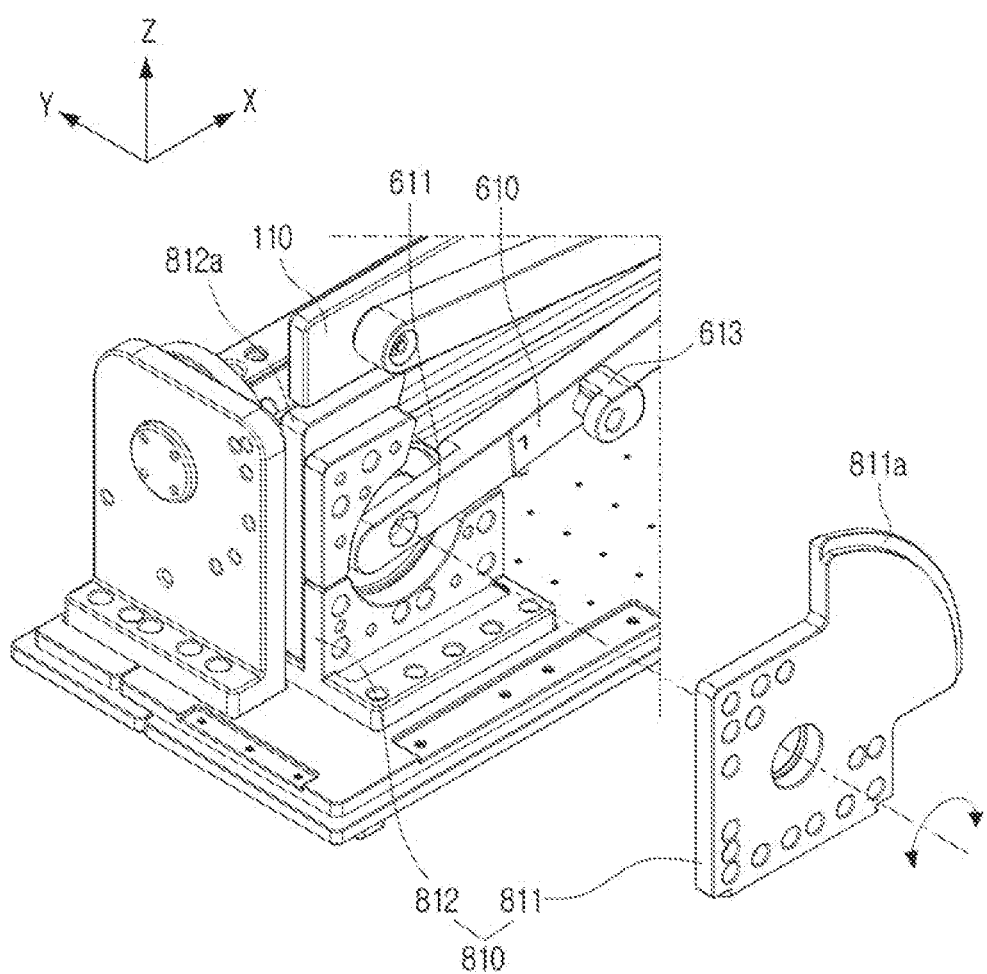
FIG. 10 is an exploded perspective view of a first support member of FIG. 5.
Figure 11:
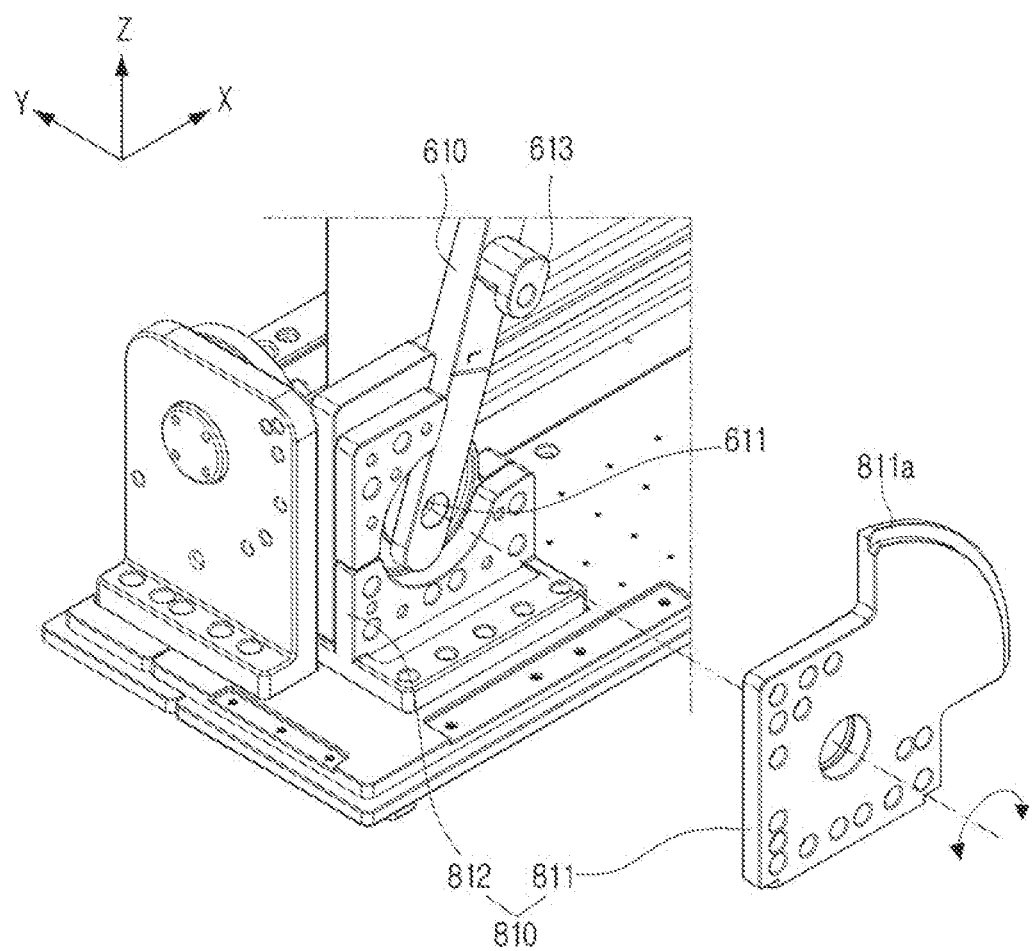
FIG. 11 is an exploded perspective view of the first support member of FIG. 6.

FIGS. 10 and 11 are exploded perspective views of the first support member of FIGS. 5 and 6, respectively.

Referring to FIGS. 10 and 11, the first support member 810 may include a pair of first plates 811 and 812 supporting rear and front surfaces of the third link 610, respectively. Similarly to the first support member 810, the second support member 820 may also include a pair of second plates supporting rear and front surfaces of the fourth link 620, respectively.

Accordingly, the third and fourth links 610 and 620 may more stably rotate with no gaps in the forward or backward direction on the vertical plane (X-Z plane).

A space may be formed between the pair of first plates 811 and 812 for one end 611 of the third link 610 to rotate. Similarly, a space may be formed between the pair of second plates for one end 621 of the fourth link 620 to rotate.

In addition, the third link 610 may have a first protrusion 613 having an "L" shape on the rear surface thereof, the first plate 811 may have a first groove 811*a* in a shape corresponding to a rotation radius of the first protrusion 613, and the first groove 811*a* may support a front portion of the first protrusion 613.

Similarly, the fourth link 620 may have a second protrusion having an "L" shape on the rear surface thereof, the second plate may have a second groove in a shape corresponding to a rotation radius of the second protrusion, and the second groove may support a front portion of the second protrusion.

As the first groove 811*a* guides the rotation of the first protrusion 613, the third link 610 may more stably rotate with no gaps along a predetermined path. Similarly, as the second groove guides the rotation of the second protrusion, the fourth link 620 may more stably rotate with no gaps along a predetermined path.

Although embodiments of the disclosure have been illustrated and described above, embodiments are not limited to the embodiments as described above, and various modifications may be made by those skilled in the art without departing from the gist of the disclosure as claimed in the appended claims. Such modifications fall within the scope of the claims.

What is claimed is:

1. A display apparatus comprising:
    a housing having an opening;
    a roll disposed inside of the housing;
    a display configured to be rolled around the roll and drawn out or in through the opening;
    a frame provided on an upper end or a lower end of the display;
    a first link having a first end rotatably connected to a first end of the frame;
    a second link having a first end rotatably connected to a second end of the frame;
    a first slider and a second slider rotatably connected to a second end of the first link and a second end of the second link, respectively; and
    a first rail and a second rail horizontally disposed inside of the housing and providing movement paths of the first slider and the second slider, respectively,
    wherein the first rail and the second rail at least partially overlap each other in a front-rear direction that is a direction from a front of the display toward a rear of the display.

2. The display apparatus as claimed in claim 1, further comprising a driving device configured to move the first slider and the second slider in opposite directions.

3. The display apparatus as claimed in claim 2, wherein the driving device comprises:
    a first screw disposed in parallel with the first rail;
    a second screw disposed in parallel with the second rail; and
    a motor configured to rotate the first screw and the second screw, and
    wherein the first slider and the second slider comprise a ball nut moving as the first screw and the second screw rotate, respectively.

4. The display apparatus as claimed in claim 3, wherein the driving device further comprises a first gear and a second gear that are provided on a first end of the first screw and a first end of the second screw, respectively, the first gear and the second gear being engaged with each other in a gear ratio of 1:1, and
    wherein the motor is configured to rotate the first gear or the second gear.

5. The display apparatus as claimed in claim 4, wherein the motor comprises a third gear connected with the first gear or the second gear.

6. The display apparatus as claimed in claim 2, further comprising:
    a first pressure member disposed in parallel with the first rail and configured to pull or push the first slider; and
    a second pressure member disposed in parallel with the second rail and configured to pull or push the second slider.

7. The display apparatus as claimed in claim 1, wherein the first link and the second link are inclined at an angle of 3 to 10 degrees with respect to a horizontal plane when the display is completely drawn into the housing through the opening.

8. The display apparatus as claimed in claim 1, wherein the first link and the second link are inclined at an angle of 55 to 85 degrees with respect to a horizontal plane, when the display is completely drawn out of the housing through the opening.

9. The display apparatus as claimed in claim 1, wherein a thickness of the first link and a thickness of the second link gradually decrease from the first ends to the second ends thereof.

10. The display apparatus as claimed in claim 1, further comprising at least one first sensor configured to detect movement amounts of the first slider and the second slider.

11. The display apparatus as claimed in claim 1, further comprising:
    a first support member and a second support member provided on a left side and a right side of the first rail and the second rail, respectively, inside the housing;
    a third link having a first end rotatably connected to the first support member and the second end rotatably connected to a point of the first link; and
    a fourth link having a first end rotatably connected to the second support member and the second end rotatably connected to a point of the second link.

12. The display apparatus as claimed in claim 11, wherein a thickness of the third link and a thickness of the fourth link gradually decrease from the first ends to the second ends thereof.

13. The display apparatus as claimed in claim 11, wherein the first support member comprises a pair of first plates supporting a front surface and a rear surface of the third link, respectively, and
    wherein the second support member comprises a pair of second plates supporting a front surface and a rear surface of the fourth link, respectively.

14. The display apparatus as claimed in claim 13, wherein the third link and the fourth link have a first protrusion and a second protrusion provided on the rear surfaces thereof, respectively,
    wherein the first plates and the second plates have a first groove and a second groove in a shape corresponding to rotation radii of the first protrusion and the second protrusion, respectively, and
    wherein the first groove and the second groove support the first protrusion and the second protrusion, respectively.

15. The display apparatus as claimed in claim 11, further comprising at least one second sensor configured to detect rotation amounts of the third link and the fourth link.

16. A display apparatus comprising:
    a housing having an opening;
    a roll provided inside of the housing;
    a display configured to be rolled around the roll and drawn out or in through the opening;
    a frame provided on an upper end or a lower end of the display;
    a first link having a first end rotatably connected to a first end of the frame;
    a second link having a first end rotatably connected to a second end of the frame;

a first slider and a second slider rotatably connected to a second end of the first link and a second end of the second link, respectively; and a first rail and a second rail horizontally provided inside of the housing and providing movement paths of the first slider and the second slider, respectively, wherein the first rail and the second rail at least partially overlap each other in a front-rear direction that is a direction from a front of the display toward a rear of the display, and wherein the first link and the second link are inclined at an angle with respect to a horizontal plane based on the display being completely drawn into the housing through the opening.

17. The display apparatus as claimed in claim 16, further comprising a driving device configured to move the first slider and the second slider in opposite directions.

18. The display apparatus as claimed in claim 17, wherein the driving device comprises:

a first screw provided in parallel with the first rail;

a second screw provided in parallel with the second rail; and a motor configured to rotate the first screw and the second screw, and wherein the first slider and the second slider comprise a ball nut moving as the first screw and the second screw rotate, respectively.

19. The display apparatus as claimed in claim 16, wherein the first link and the second link are inclined at the angle of 3 to 10 degrees with respect to the horizontal plane based on the display being completely drawn into the housing through the opening.

20. The display apparatus as claimed in claim 16, wherein the first link and the second link are inclined at the angle of 55 to 85 degrees with respect to the horizontal plane, when the display is completely drawn out of the housing through the opening.

* * * * *